United States Patent [19]

Comerford

[11] Patent Number: 5,148,534
[45] Date of Patent: Sep. 15, 1992

[54] HARDWARE CARTRIDGE REPRESENTING VERIFIABLE, USE-ONCE AUTHORIZATION

[75] Inventor: Laim D. Comerford, Carmel, N.Y.

[73] Assignee: International Business Machines Corp., Armonk, N.Y.

[21] Appl. No.: 680,798

[22] Filed: Apr. 3, 1991

Related U.S. Application Data

[63] Continuation of Ser. No. 927,297, Nov. 5, 1986, abandoned.

[51] Int. Cl.$^5$ .............................................. G06F 12/14
[52] U.S. Cl. .................................... 395/425; 380/4; 380/24; 380/25; 364/DIG. 1; 364/222.5; 364/286.4; 364/286.5; 364/918.7
[58] Field of Search ............... 364/200 MS, 900 MS; 395/425; 380/4, 24, 25

[56] References Cited

U.S. PATENT DOCUMENTS

| | | | |
|---|---|---|---|
| 3,906,460 | 9/1975 | Halpern | 340/172.5 |
| 4,287,568 | 9/1981 | Lester | 364/900 |
| 4,310,895 | 1/1982 | Edstrom et al. | 364/900 |
| 4,347,582 | 8/1982 | Frank | 364/900 |
| 4,430,728 | 2/1984 | Beitel | 364/900 |
| 4,433,207 | 2/1984 | Best | 178/22.09 |
| 4,433,387 | 2/1984 | Dyer et al. | 364/900 |
| 4,435,781 | 3/1984 | Stattel et al. | 364/900 |
| 4,439,670 | 3/1984 | Basset et al. | 235/382 |
| 4,446,519 | 5/1984 | Thomas | 364/300 |
| 4,458,315 | 7/1984 | Uchenick | 364/200 |
| 4,471,163 | 9/1984 | Donald | 178/22.08 |
| 4,471,216 | 9/1984 | Herve | 235/380 |
| 4,477,852 | 10/1984 | Ota et al. | 360/114 |
| 4,486,751 | 12/1984 | Mole | 340/825.31 |
| 4,499,556 | 2/1985 | Halpern | 364/900 |
| 4,513,199 | 4/1985 | Sidline | 235/449 |
| 4,532,507 | 7/1985 | Edson et al. | 340/825.31 |
| 4,553,203 | 11/1985 | Rau et al. | 364/200 |
| 4,562,306 | 12/1985 | Chou | 178/22.08 |
| 4,572,946 | 2/1986 | Schrenk | 235/380 |
| 4,575,621 | 3/1986 | Dreifus | 235/380 |
| 4,596,985 | 6/1986 | Bongard et al. | 340/825.69 |
| 4,599,489 | 7/1986 | Cargile | 178/22.08 |
| 4,605,820 | 8/1986 | Campbell, Jr. | 380/24 |
| 4,609,777 | 9/1986 | Cargile | 178/22.08 |
| 4,630,201 | 12/1986 | White | 364/408 |
| 4,652,990 | 3/1987 | Pailen et al. | 364/200 |
| 4,654,792 | 3/1987 | Thomas | 364/200 |
| 4,712,177 | 12/1987 | Schrenk | 364/200 |
| 4,727,975 | 3/1988 | Eisermann | 194/205 |
| 4,734,855 | 3/1988 | Banatre et al. | 364/200 |
| 4,755,815 | 7/1988 | Savoyet et al. | 340/825.31 |

FOREIGN PATENT DOCUMENTS 2124808  2/1984  United Kingdom .

Primary Examiner—Gareth D. Shaw
Assistant Examiner—Maria M. Von Buhr
Attorney, Agent, or Firm—Pollock, Vande Sande & Priddy

[57] ABSTRACT

A hardware cartridge performs the function of a verifiable, use-once authorization. The hardware cartridge is provided with physical security so that its contents are not accessible except via a specific protocol. The cartridge stores data in two or more segments. The cartridge responds to a query or challenge by outputting that portion of the data it stores selected by the query or challenge. Assuming the authorizing device has access to the complete contents of the hardware cartridge, it can verify the authenticity by receiving only that portion of the contents selected by its query. In one embodiment, the two segments comprise a pair of shift registers which feed data to a multiplexer; the multiplexer is controlled by the query to output the selected portion of the stored data. In another embodiment, a plurality of segments are stored in a random access memory which is addressed by the query. In both embodiments, after the selected data is output, the hardware cartridge no longer stores at least the unselected portion of the originally stored data.

10 Claims, 4 Drawing Sheets

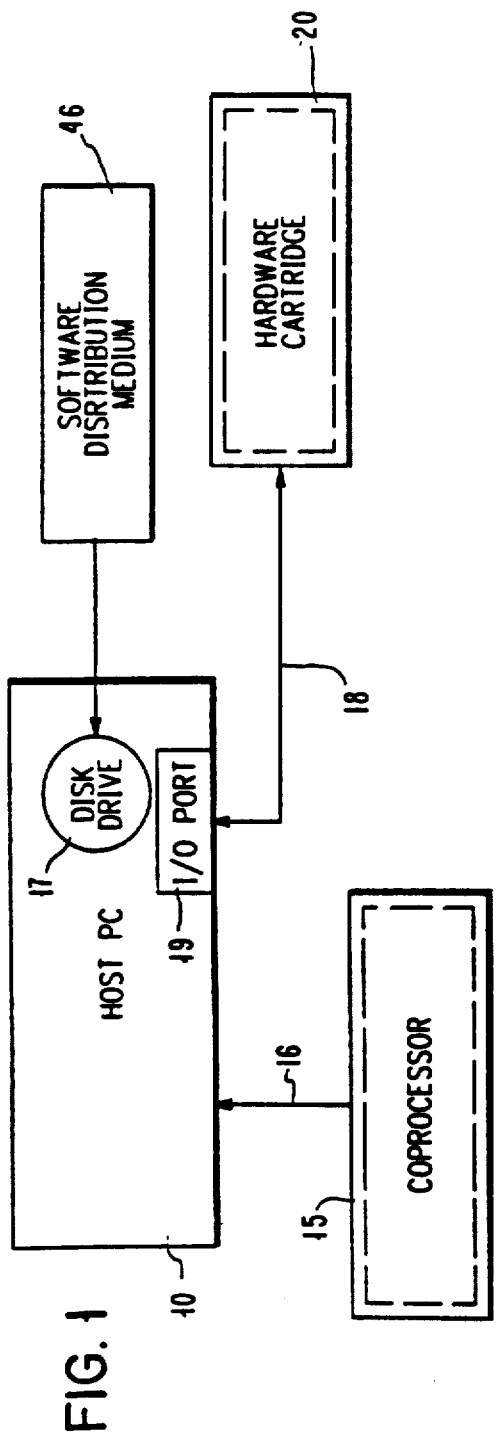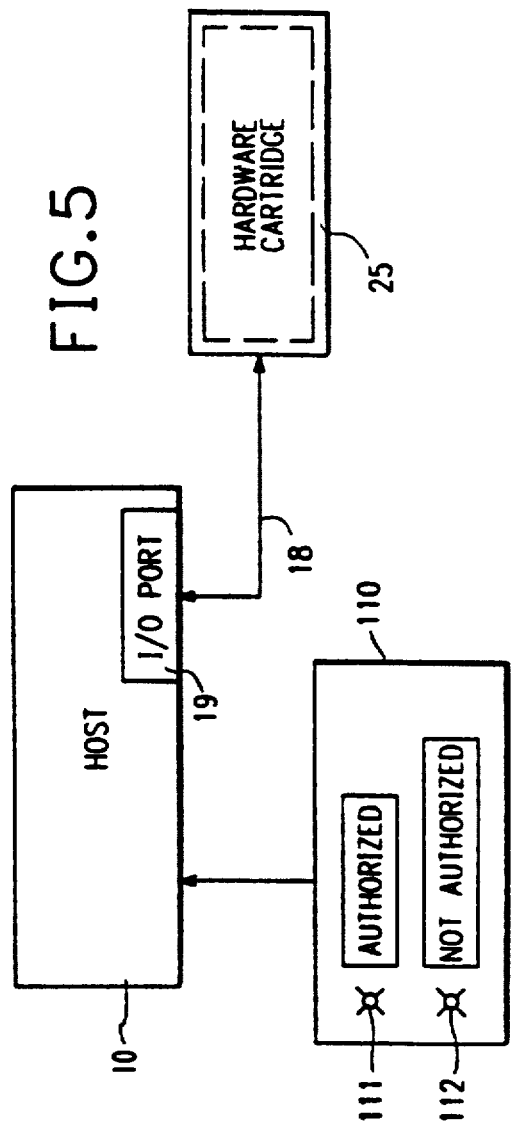

HARDWARE CARTRIDGE REPRESENTING VERIFIABLE, USE-ONCE AUTHORIZATION

This is a continuation of copending U.S. application Ser. No. 06/927,297 filed on Nov. 5, 1986, now abandoned.

DESCRIPTION

1. Technical Field

The invention relates to a secure, electronic device capable of use as a use-once authorization mechanism or token.

2. Background Art

In many fields there are occasions on which there is need for a device which can be used as evidence of the bearer's authority, identity or entitlement to some right or privilege, where this evidence is applicable to one and only one use, relatively inexpensive to manufacture, simple to verify or authenticate and difficult to forge or simulate. While such a device has some of the properties associated with a mechanical key (when used with a mechanical lock), there are vast differences; a key is relatively easy to copy and it is distinctly not a use-once device. Actually, the device in accordance with the invention may be likened to a wax seal used on an envelope to evidence the fact that the contents of the envelope had not been accessible between the time the seal was put in place and the time the seal was broken. In order to improve the qualities of wax seals, users imprinted them with a distinctive pattern so that it would be more difficult to copy or simulate the wax seal than had the pattern been omitted.

Uses of such a verifiable, use-once device or token arise in a variety of fields. For example, copending application Ser. No. 927,629, filed Nov. 5, 1986, now U.S. Pat. No. 4,817,140, issued Mar. 28, 1989, the disclosure of which is incorporated herein by this reference, assigned to the assignee of this application, describes a software protection system using a single key crypto system, a secure coprocessor and a hardware based authorization system to inhibit copying of protected software. In this mechanism the token is provided in the form of a hardware cartridge which represents authorization to the coprocessor to accept the right to execute the software. When the hardware cartridge is presented to a cooperating coprocessor, the authenticity of the cartridge is challenged, and if verified, the right to execute an associated application or piece of software is accepted by the cooperating coprocessor, leaving the cartridge in such a condition that it cannot thereafter authorize other cooperating coprocessors.

In another application, the hardware cartridge could represent the right of the bearer to passage on some transportation system, as would an airline ticket. The right represented by an airline ticket may have significant value, but the carrier issuing the "ticket" finds it necessary to receive assurance that the "ticket" is used only once. As will be described below, the hardware cartridge described herein as the properties allowing it to be used as such a "ticket".

Finally, in another context, the hardware cartridge can represent the right of entry to some secure location. In this case, the use-once feature assures the entity granting the right of entry that the cartridge can only grant access to a single bearer so that even if the bearer passes the cartridge to another individual at the time access is granted, the cartridge cannot be thereafter again used to authorize access to another individual. In the event the bearer leaves the secure premises and is entitled to subsequent access, he is provided with a different hardware cartridge, or the original hardware cartridge is recharged, hence re-enabled.

As has been indicated, in order to be reliable the hardware cartridge should be difficult, and preferably arbitrarily difficult, to simulate. In a similar setting, Halpern in U.S. Pat. No. 3,906,460, suggests that a secret "check" character be employed and the cartridge arranged so that it rejects information in the absence of the correct "check" character. In the applications described by Halpern, where the token is employed on the premises of the party issuing the token (for example, such as the Bay Area Rapid Transit System, or a bank), this may be a useful technique. On the other hand, in many applications (such as the software protection application described in copending application Ser. No. 927,629, now U.S. Pat. No. 4,817,140, or in gaining access to a secure space) a person bent on mischief or crime may have not only access to the token or cartridge itself, but also to the transaction by which a token is validated. Under these circumstances, the Halpern technique of using a secret "check" character would immediately fail since by once observing a valid transaction such person could thereafter simulate or copy the secret "check" character. Thus it must be recognized that not only will the hardware cartridge be accessible to a determined pirate, but the transaction by which the cartridge is validated (including all the information which flows between the cartridge and any validating device) may also be accessible to the pirate. Thus, the cartridge should be arranged so that the information exchanged during a validating transaction, while sufficient to verify the authenticity of the cartridge, is inadequate to simulate the cartridge at any later time.

SUMMARY OF THE INVENTION

The invention meets these and other objects by providing a hardware cartridge which is capable of storing information (token data) which can be used to authenticate the source of the physical cartridge as well as the fact that it has not heretofore been employed. In accordance with the invention, the hardware cartridge is arranged so that this protection is maintained notwithstanding the fact that a pirate may have access not only to the hardware cartridge itself but to a transaction in which a specimen cartridge is validated by some validating mechanism.

In accordance with the invention, the token data is stored electronically; the apparatus in which it is stored is provided with physical security. Two suitable techniques for physical security include:

1) the techniques described in applicant's copending application Ser. No. 927,309, filed Nov. 5, 1986, the disclosure of which is incorporated herein by this reference, and
2) implementing the electronic storage along with peripheral hardware on a single chip.

In one embodiment of the invention the token data is stored in a device containing memory elements in the form of shift registers. As will be described, the token data is divided into at least two, mutually exclusive portions. More than two portions may also be employed. The token data can be in the form of a secret "number", typically represented in the storage device in binary form.

The validating apparatus has access to each and every valid "number". The means for providing this access will be described below. The hardware cartridge includes a connector so that it can be electrically connected to the validating device. If the validating device merely stimulated the hardware cartridge to generate an electronic representation of the "secret" number, the pirate having access to the transaction could simulate the effect of the cartridge to the detriment of the security system.

Accordingly, in accordance with an embodiment of the invention, the validation transaction does not expose all of the secret "number"; rather, a sufficient portion of the secret "number" is exposed, which portion is sufficient to verify the presence of the secret "number" stored in the hardware cartridge but simultaneously inadequate to allow a person bent on mischief or crime to simulate the effect of the hardware cartridge.

The validating transaction takes the form of a challenge implemented by a query. The validating apparatus may generate the query as a random number; in the event the token data is divided into two portions, the random number can be represented in binary notation. For each bit of the query, one bit from one of the two halves of the token data is output to the validating mechanism; which bit is selected is determined by both the position and value of the corresponding bit in the "query". At the conclusion of the transaction, exactly 50% of the token data has been exposed; which 50%, however, is determined by the "random" number. While it is assumed that the pirate will have access to both the random number and the response, that information is useful only to the extent that he can somehow force the validating mechanism to again generate the identical random number in the course of a subsequent challenge.

In accordance with this embodiment of the invention, the shift register storing the token data has special properties to ensure that at the completion of the query/response transaction, the hardware cartridge which initially stored the token data thereafter no longer stores the token data. This ensures that a hardware cartridge, once used, cannot be used again, unless it is recharged by the validating mechanism. Clearly, it is critical that this recharging not be performed in such a manner or location that it can be observed by a person bent on mischief or crime.

In accordance with the embodiment of the invention being described, the hardware cartridge includes two shift registers, each storing mutually exclusive halves of the token data. The shift out terminals of the two shift registers are coupled to the inputs of a 2/1 multiplexer. The output of the 2/1 multiplexer is stored in a D type latch, the output of which is the output of the hardware cartridge, e.g. the response terminal. The validating mechanism is coupled to a connector or, the hardware cartridge which includes, in addition to an output terminal, a select terminal, a clock terminal and power and ground terminals. The clock terminal is used to couple clock pulses to step the shift registers and clock the latch. The select terminal is coupled to the control terminal of the 2/1 multiplexer. The validating mechanism's query and clock pulses are input to the token terminals. The 2/1 multiplexer selects at each clock time the output of one or the other of the shift registers. The selected contents of the shift registers are latched depending on the particular select pulse pattern into the D-latch and are output from there to the validating mechanism. The shift registers have input terminals which are connected to data input terminals in the connector. The connector's data input terminals may or may not be connected to terminals in the validating mechanism. Regardless of the connection of these data input terminals, after a number of clock pulses had been received which is equal in length to the length of the shift registers, the shift registers will no longer contain the token data which they had previously contained. Unselected information is shifted out to the multiplexer but is destroyed there during the selection function.

It should be noted that a third function of the shift registers content beside select register 1 or select register 2 may be obtained by taking either the EXCLUSIVE-OR or the NOT-EXCLUSIVE-OR of the two registers and providing it as a selectable output to the data latch. This requires, a slightly more complex multiplexer to accept the additional select bit needed to specify the added selection, but offers increased resistance to forgery for any length token.

Accordingly, the invention provides a physically secure, forgery-resistant authorization device comprising:
 an output device,
 storage means including at least first and second distinct storage elements for electronically storing information and for coupling signals representative of said stored information to said output device,
 a connector for coupling said output device to an external device, said connector including a select input and an output terminal,
 means for connecting said select input to said output device,
 said output device including selection means responsive to signals on said select terminal for selecting and coupling to said connector signals from either said first or second distinct storage elements, said output device further including means, simultaneous with said coupling, for destroying unselected information,
 whereby selected information is output, neither said first nor said second distinct storage elements to retain said unselected stored information.

In another embodiment of the invention, the storage device is in the form of a random access memory which includes a plurality of addressable storage locations all the storage locations together storing the token data. These storage locations may be filled by writing to each one individually by setting the address lines to each address in turn, setting the data lines to the data to be stored at that address, setting the read/write control line to write, and pulsing the strobe line. In this respect, the write-data-to-memory cycle of the memory is perfectly conventional. The read-data-from-memory cycle is, however, not conventional. During this cycle, a portion of the memory is overwritten (and therefore the stored but unselected information is destroyed) with the content which is being read from the addressed (selected) portion of the memory. A pair of addressed locations (one to be read, one to be overwritten) could be identified by having only one bit in their addresses differ. The data from the selected address is stored in a data output register. The other memory of the pair (the unselected me member) is, at the same moment as the output register, enabled to write the content of the selected memory of the pair into itself. Its original content is thus overwritten and obliterated. Since that data is also presented outside the token at the data terminals as part of the response, the net effect of the read cycle is to guarantee that a completely read token contains only data which has already been revealed and is incapable of correctly responding to a query which is in any respect different from the first query which read it. It should be noted that in this embodiment, the address lines play the role of the select line in the previous embodiment, and that the role of the clock line in the previous embodiment is played by the combination of the read/write select and the strobe lines in this embodiment.

It should also be noted that in this embodiment the correspondence between select bits and data bits seen in the earlier embodiment is not present.

Accordingly, in this other embodiment the invention provides a physically secure, forgery-resistant authorization device comprising:

storage means for retaining stored information, a connector with an output terminal and a select input, first means responsive to select information represented at said select input for selecting and coupling to said output terminal signals representative of a selected portion of said stored information and for simultaneously destroying an equal quantity of unselected stored information, whereby after said selected information is output via said connectors, said device no longer retains said equal quantity of said unselected stored information.

It is also worth noting that, given the large amount of data storage possible in modern CMOS static random access memory chips, more than one validation could be stored in such a token without compromising the security of the validation system.

BRIEF DESCRIPTION OF THE DRAWINGS

The invention will now be further described so as to enable those skilled in the art to practice the same when taken in conjunction with the attached drawings in which like reference characters identify identical apparatus and in which:

FIG. 1 schematically illustrates application of the hardware cartridge of the invention in accordance with a software copy protection mechanism;

FIG. 5 schematically illustrates use of the inventive hardware cartridge in the context of allowing access to a physical location.

DETAILED DESCRIPTION OF PREFERRED EMBODIMENTS

Figure 2:
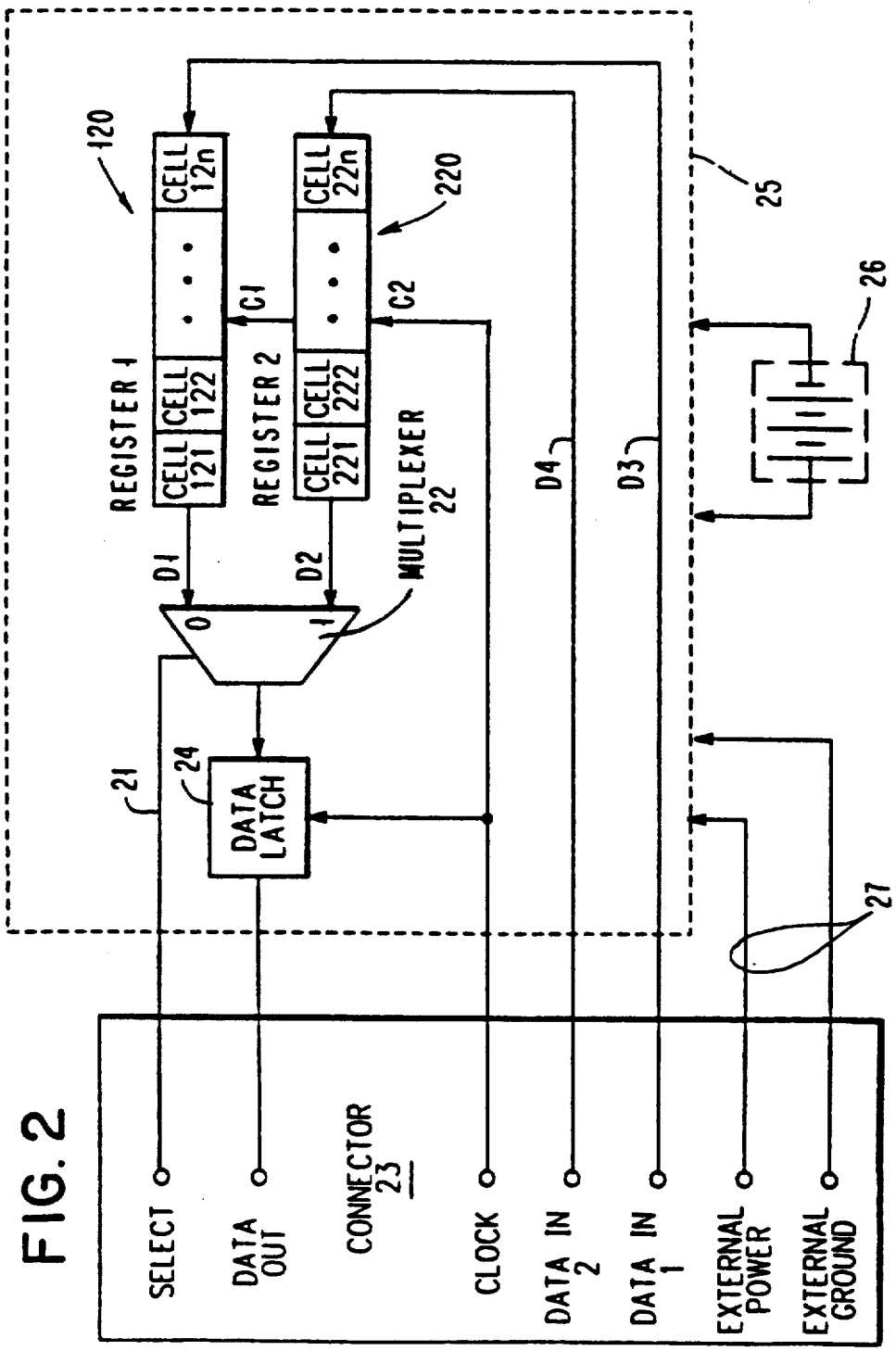
FIG. 2 is a block diagram of a particular embodiment of the hardware cartridge of the invention.

FIG. 1 shows a composite computing system including a host computer 10 (referred to in FIG. 1 as a host PC, since the PC is representative of typical host systems), and a coprocessor 15 which is in communication with the host PC 10 via a bidirectional communication path 16. As is typical of many host computers, the host system 10 includes a disk drive 17, and as shown in FIG. 1, a software distribution medium 46 is associated with the disk drive 17; the software distribution medium could be a floppy disk. As is described the copending application Ser. No. 927,629 now U.S. Pat. No. 4,817,140, the software distribution medium includes several files, one of which is an encrypted software file. Decryption of that software file requires that authorizing information be communicated to the coprocessor 15. The authorizing information is contained in the hardware cartridge 20. As shown in FIG. 1, the hardware cartridge 20 is coupled to an I/O port 19 of the host 10 via a conventional connector 18. In order to protect the security of the software copy protection mechanism, both the coprocessor 15 and the hardware cartridge 20 are physically and logically secure; these features are schematically represented by the inner dotted outline. Suitable physical security for the coprocessor 15 may be provided as is described in the copending application Ser. No. 927,309 which describes a tamper-resistant package or enclosure. Physical security for the hardware cartridge 20 may be provided in an identical fashion or, in lieu of that technique, the active elements of the hardware cartridge may be incorporated in a single chip to implement a tamper-resistant package. The physical security of the hardware cartridge ensures that the token data it stores is not accessible to a pirate, or even to the user of the device. The coprocessor 15 also stores sensitive information and its physical security protects that information as well. Validation of the hardware cartridge 20, which is required before authority to execute the software stored in the software distribution medium 46 is granted, is implemented by a query/response protocol which has the property of providing sufficient information to the coprocessor 15 of the authenticity of the hardware cartridge 20 without at the same time revealing sufficient information to one observing the transaction, for example through the connector 18, to allow the observer to simulate, in a later transaction, the behavior of the hardware cartridge 20. Reference is now made to FIG. 2 to describe an embodiment of the hardware cartridge 20 and, in that connection, more particularly describe the query/response protocol used to validate the authenticity of the hardware cartridge 20.

FIG. 2 is a block diagram of one embodiment of cartridge 20. In this embodiment the token device is implemented as a single silicon CMOS integrated circuit chip 25 for cost and physical security reasons. This chip is appropriately packaged so that the data storage elements 120, 220 are continuously powered by a battery 26. CMOS integrated circuits can be built with static power requirements so small that the data stored in these registers, if not read out, can be expected to be preserved for a period almost equal to the shelf life of the battery. In the case that the data is read, as will be described, the other components needed to affect reading are supplied with power from an external source through the external power and ground lines 27. As shown in FIG. 2 the cartridge 20 is coupled to the coprocessor or the host PC via connector 23 having Clock, Selection, Data Input, Data Output, External Power and External Ground lines. The cartridge 20 contains two memory segments in the form of Serial In, Serial Out, Shift Left, Shift Registers 120, 220, a first segment including cells 121-12n and a second segment including cells 221-22n. Shift registers of this kind have the property that the state of the bit stored in their left-most cells (121, 221) is reflected in the state of their output lines (D1, D2). They have the additional properties that when the falling edge of a clock pulse is presented at their clock lines (C1, C2) the state of each cell is changed to that of the cell to its immediate right so that the pattern of bits in the register is shifted to the left. In the case of the right-most cells (12n, 22n) the falling edge of the clock pulse causes these cells to assume the state of the data input lines (D3, D4). The cells can be filled with data by supplying a data bit at each of the two data input lines and then supplying a clock pulse. If this procedure is repeated for n clock pulses, then all n bits of registers will be filled. A copy of these bits could then be made, encrypted and stored on a floppy disk to supply the encrypted description of the token data. This encrypted copy may be encrypted under the same key (the application key or AK) as is used to encrypt the software so that relationship of the software to the token can be verified. It should be understood that in any application of this technology, the act of reading the token contents validates an authorization if and only if the result of executing the query/response protocol corresponds to the result of executing a simulation of that protocol on the token data found in said encrypted file. The key used to encrypt the token data file indicates the source of the authorization to be validated and the unused state and correct data content of the token indicates the validity of the authorization. This procedure is followed by a software author to prepare the authorization to a coprocessor to accept an AK so that it may execute the protected software in the future.

When a read operation, on the cartridge 20, is performed, each bit of a coprocessor generated random number is placed consecutively on the select line. Each setting of the select line 21 is followed by a clock pulse. Both shift registers will shift left on each clock pulse. Data from the first shift register is placed on the line D1 and from the second shift register on the line D2; both of which are inputs to a multiplexer 22 which is in turn controlled by the select line 21 from the coprocessor or host PC. The select line 21 determines which of the two signals D1 or D2 are coupled through the latch 24 to the output DATA. The latch is used to prevent a pirate from obtaining the complete token data by changing the select line twice for each clock pulse. The consequence of this arrangement is that for each bit which is presented at the data out, two bits have been shifted out of the left end of the registers, and two bits, which are useless for authorization, have been shifted in at the right end.

Accordingly, and assuming that the entire memory contents of the cartridge 20 were read out, one observing the input to the select line 21 and DATA output, would only observe, at most, 50% of the contents of the cartridge 20. The coprocessor 15 knows from the Encrypted token data exactly what bits should have appeared in that 50% so it has sufficient information to confirm the validity of that authorization, but a pirate lacking the destroyed 50% will not be able to forge an authorization because of the overwhelming likelihood that the next challenge query will differ substantially from the one observed and that the pirate will be unable to guess every bit of the required response correctly. Clearly, the number of bits stored in this device can be increased or decreased in order to match the requirement imposed by cost and the need for assurance of validity.

Figure 3:
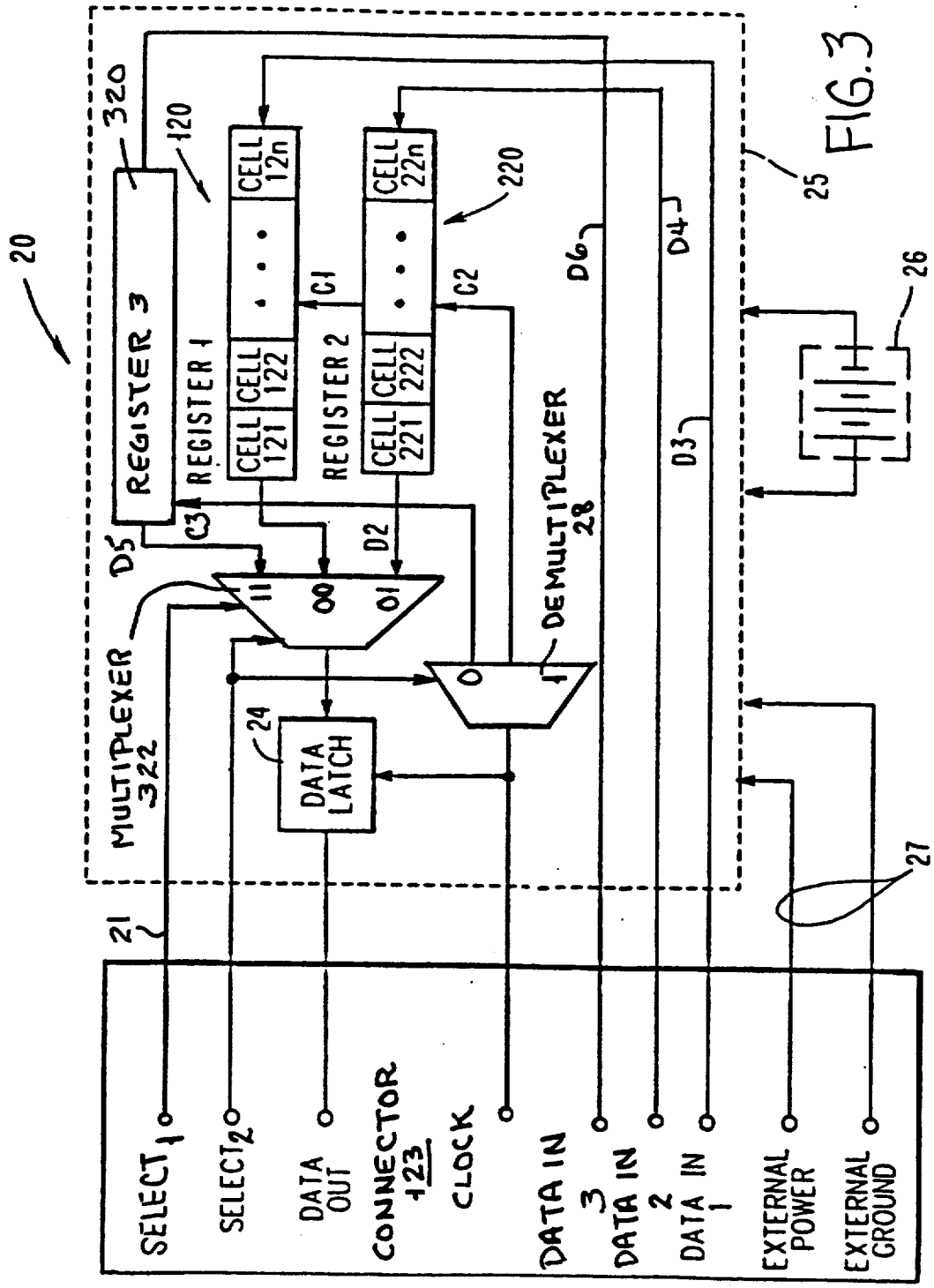
FIG. 3 is a block diagram of a different embodiment of a hardware cartridge in accordance with the invention.

FIG. 3 is entirely similar to FIG. 2 except that the hardware cartridge 20 includes in addition to the registers 120 and 220 (previously described), a third register, 320 and the additional select line and data input line needed to address and read register 320. Thus connector 123 includes Select 1 and Select 2 lines, and Data In 1, Data In 2 and Data In 3, in contrast to connector 23 (of FIG. 2). Multiplexer 322 has input D1 (from shift register 120), D2 (from shift register 220) and D5 (from register 3). Demultiplexer 28 directs the clock signal to either registers 120, 220 or register 320 in dependence on the state of Select 2 line. Input to register 320 is from Data In 3 via line D6. The register 320 may store information beyond the encrypted copy of the token data and typically the information will not be sensitive or will be protected by encryption prior to its loading. This type of information includes the encrypted token data; accordingly, the hardware cartridge 20 is arranged so that when the contents of the register 320 are read out, they can be recirculated and maintained. The ability to access Register 3 (320) for loading and reading is achieved by providing Data In 3, Data Out (D5) and Clock (C3) paths to the new register. Clock is provided to Register 3 by routing the clock to either Register 1 and 2 or Register 3 through a demultiplexer 28. The path depends on the state of the second select line select 2. Alternatively a second clock line could be provided or the demultiplexer 28 could route the clock on the basis of the state of both select lines. Data input D6 to Register 3 is shown as a separate connection to the connector 123. Alternatively, it could be obtained by rerouting Data In 1 or Data In 2 as was done with the clock. Data output is achieved by enlarging the multiplexer 22 to allow an additional input D5 from Register 3 which could be specified by select line 2, as shown. Alternatively, a second Data Out could be provided to output D5 directly or the multiplexer 22 could be made to select D5 giving Register 3 output for other specific combinations of the states of the select bits. Many other functionally equivalent variations are possible.

Figure 4:
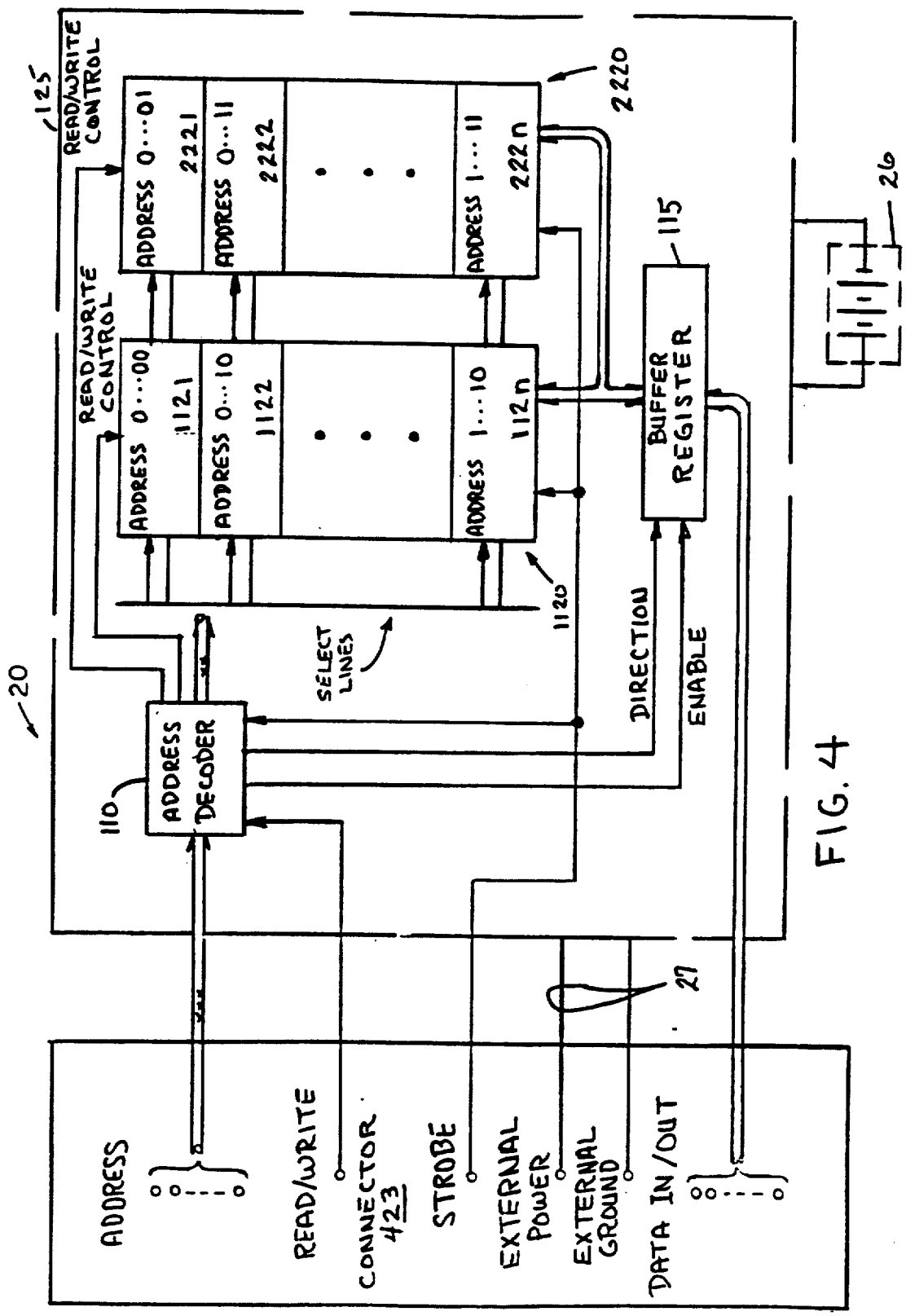
FIG. 4 is a block diagram of still another embodiment of the hardware cartridge of the invention.

FIG. 4 shows still another embodiment of the invention. In this case the hardware cartridge 20 includes, on the chip 125, two blocks of random access memory 1120, 2220 including addressable storage locations 1121, 1122, ..., 112n, 2221, 2222, ..., 222n. The random access memory blocks 1120, 2220 are addressed via an address decoder 110. Inputs of the address decoder 110 are connected to the address terminals in the connector 423. A strobe terminal in the connector 23 is coupled both to the address decoder 110 and the random access memory. The data I/O connections of the random access memory blocks 1120, 2220 are coupled to the Data In/Out terminals of the connector 423 via a buffer register 115. The chip 125 is continuously powered by the battery 26 when not being written to or read from and is externally powered through the external power and ground lines 27 when reading from or writing to the token is required.

In the event that the token is being written to (loaded), one of the memory cells 1121, ..., 112n, 2221, ..., 222n is specified by the address set at the address lines of the connector 423, the data to be written to the cell is set at the Data In/Out lines of the connector 423, the objective of writing the data is set at the read/write line of the connector 423 (for example 1 may specify read and 0 may specify write). The valid state of these lines may then be signaled to the chip by, for example, changing the state of the strobe line from low to high. The address decoder will then enable the buffer register 115 to pass data through to the memory blocks and enable the specific memory cell at the specified address to accept the data present on the data lines. The data will be written in that cell when the strobe line again changes state.

In the event that the token is being read from (discharged), one memory cell to be read is specified by the address set at the address lines of the connector 423, the objective of reading data from that cell is set at the read/write line and the valid state of these lines is signaled by the change of state of the strobe line. The address decoder 110 will then enable the selected cell to place its contents on the data lines, and will enable the corresponding cell in the other block of memory to write the data line contents into itself. When the strobe line again changes state, the buffer register 115 is enabled by the signals supplied on its direction and enable lines from the address decoder 110 to present this data on the data lines available at the connector 423. The token described above thus has the property that on reading, half the data is overwritten by the half which is revealed. Such tokens may have sufficient storage capacity that the encrypted token description may be stored in selected locations of the RAM. Similarly, the previously described shift register based token may have a register which is long enough to store both token data and the encrypted token description.

In many applications of the cartridge of FIGS. 2-4, it is discharged on any use. However, that is not the only application. Copending application Ser. No. 927,299, filed Nov. 5, 1986, now U.S. Pat. No. 5,109,413, issued Apr. 28, 1992 the disclosure of which is incorporated by this reference, describes a backup procedure that may require repeated use of the cartridge. As described, on each such use only a portion of the token data is used, leaving unused portions available for subsequent uses. It should be apparent to those skilled in the art that the architecture of FIG. 4 readily lends itself to such repeated uses. There is no theoretical reason barring use of the architecture of FIGS. 2, 3 from this repeated use environment since even these architectures destroy only that portion of the token data which is actually shifted out of the registers 120, 220. The architectures of FIGS. 2/3 do not lend themselves to such repeated use application because of the practical disadvantages concerning the cost of relatively long shift registers.

FIG. 5 shows use of the hardware cartridge 20 in another context. In this context, the bearer of the hardware cartridge requires access to a physical location. At the physical location, a host computer 10 controls a mechanism such as the display 110. The display 110 includes signal lights 111 and 112 which are energized by the host 10 in the event the hardware cartridge 20 is or is not authentic, respectively. Simultaneous with energizing the authorizing display 111, a gate or other access mechanism can be enabled so that the bearer of the cartridge 20 can enter. The host 10 includes an I/O port 19 just as in the case of FIG. 1 which is in communication with the hardware cartridge 20 via a typical connector 18. The same procedures the host employed in connection with FIG. 1, to determine the authenticity of the cartridge 20 are used in connection with FIG. 5 to determine the authenticity of the hardware cartridge 20.

Under certain circumstances, it is desirable for the host 10 to have the capacity for reloading or recharging a hardware cartridge 20 which has been discharged by having been read once. This may be allowed in a "public" place only under the conditions that:

it is made physically impossible to make a connection to more than just the token which is being read and recharged; and it is made physically impossible to remove the token and insert a different device in its place between the time of reading and the time of reloading the token.

These precautions are needed to prevent more than one token from being recharged and to prevent a device which does not protect the token data from being substituted for a token when recharging takes place.

The precautions may be accomplished in much the same way that is used for automated bank teller machines where the user's identity card is held within the machine for the period of the transaction. The desirability of such reloading in the field should be carefully weighed against the potential for breach of the system. In general, it is desirable to load tokens in a location secured to the satisfaction of the source of the authorization validated by the token.

Recharging the cartridge merely requires reloading the registers, or rewriting the random access memory with the secret number. Referring for example to FIG. 2, it is apparent that the host 10 can, via the I/O port 19, couple the appropriate token data, on the data in 1 terminal and data in 2 terminal, coupled to the conductors D3 and D4, respectively, to the input terminals of the registers 120 and 220. By clocking these registers in an entirely conventional fashion, the token data is loaded back into the registers 120 and 220, thus recharging the cartridge and enabling it for an additional use.

It should be apparent therefore that the invention provides a method and apparatus for an authorizing token, the authenticity of which can be verified in the transaction which, notwithstanding the fact that it may be exposed to a pirate, transfers sufficient information to verify the authenticity of the cartridge without revealing sufficient information to compromise the security mechanism. While specific embodiments of the invention have been described in detail, the invention should not be limited by the specific embodiments which have been described and rather the invention is to be construed in accordance with the attached claims.

Having thus described my invention, what I claim as new, and desire to secure by Letters Patent is:

1. A physically secure forgery-resistant authorization device comprising:

storage means for retaining stored information comprising first and second data subsets, each of said subsets comprising an equal quantum of data, a connector with an output terminal and a select terminal, first means responsive to select information represented at said select terminal and to said storage means for selecting and coupling to said output terminal signals representative of only a portion of said first and second data subsets and for simultaneously destroying that data from said subsets not coupled to said output terminal, wherein said first means further includes means for destroying said selected stored information, said means for destroying operating along with said first means so that after said selected information is output from said output terminal said device no longer retains either said selected or said unselected stored information.

2. A physically secure authorization device as recited in claim 1 in which said storage means comprises shift registers and in which said first means comprises:

a clock terminal, means coupling said clock terminal to said shift registers for shifting information stored therein in response to clock pulses received at said clock terminal, a multiplexer with inputs coupled to said shift registers and a control input coupled to said select terminal, and output means for coupling signals passed by said multiplexer to said output terminal.

3. A physically secure authorization device as recited in claim 2 in which said output means includes a latch with a clock input coupled to said clock terminal, an input coupled to an output of said multiplexer and an output coupled to said output terminal.

4. A physically secure forgery-resistant authorization device comprising:

an output device, storage means comprising a random access memory with a plurality of distinct storage locations, for electronically storing information and for generating signals representative of stored information, said storage means storing data in correlated sets, with each set comprising first and second subsets, a connector for coupling said output device to an external device, said connector including a select terminal and an output terminal, said output device including selection means responsive to signals on said select terminal for selecting and coupling, to said output terminal of said connector, signals generated by reading from a selected one of said storage locations in response to said signals on said select terminal, said selection means including address decoder means with an input coupled to said select terminal of said connector for addressing said random access memory and means responsive to addressing any of said distinct storage locations for coupling to said connector output terminal signals representative of information comprising one said subset stored in an addressed one of said distinct storage locations and for erasing information stored in at least a different one of said distinct storage locations comprising a correlated subset, and wherein said connector further includes at least a data input terminal coupled to at least one input of said random access memory.

5. A method of logically securing an authorization device, for imitation or unauthorized use, said authorization device electronically storing authenticating data for output to an electronic checking device to verify authorization, said method comprising the steps of:

a) storing a given quantum of authorization data;

b) responding to a selection inquiry by destructively reading a first set of aid authorization data;

c) selecting a subset of said first set of data for output to said checking device in response to a selection signal from said checking device which defines the subset of said first set of data for output, and d) coupling said subset of said first set of data from said authorization device to said checking device, whereby the data passing between said checking device and said authorization device comprises said selection signal and the subset of said first set of data which, taken together is inadequate as a basis to imitate operation of said authorization device at a later time.

6. The method as recited in claim 5 wherein said given quantum of authorization data is equal to said first set of said authorization data so that said authorization device is capable of only a single use.

7. The method recited in claim 5 wherein said given quantum of authorization data is larger than said first set of said authorization data so that said authorization device is capable of more than a single use.

8. The method as recited in claim 5 wherein said first set of said authorization data is stored in first and second distinct storage elements and wherein said step (c) comprises sequentially selecting from corresponding pairs of elementary bits of data from said distinct storage elements, one elementary bit of data for output.

9. The method recited in claim 5 wherein said authorization data is stored in first and second distinct storage elements and wherein said step of electing a subset of said first set of data comprises selecting data from either said first or said second distinct storage element.

10. A physically-secure, forgery-resisting authorization device comprising:

storage means for retaining stored information comprising first and second data subsets, each of said subset comprising an equal quantum of data, said storage means including addressable random access memory;

a connector with an output terminal and a select terminal, first means responsive to select information represented at said select terminal and to said storage means for selecting and coupling to said output terminal signals representative of only a portion of said first and second data subsets and for simultaneously destroying that data from said subsets not coupled to said output terminal, wherein said first means includes:

an address decoder coupled to said select terminal for selecting a first RAM segment and a corresponding second RAM segment in response to said select information;

an output register responsive to said random access memory for copying information from said first RAM segment; and means for coupling information from said output register to said output terminal and for writing said information into said second RAM segment.

* * * * *